United States Patent
Wade

(10) Patent No.: US 9,760,883 B1
(45) Date of Patent: Sep. 12, 2017

(54) FEEDBACK CONTROL LOOP FOR NFC TRANSMITTER VOLTAGE CONTROL

(71) Applicant: Square, Inc., San Francisco, CA (US)

(72) Inventor: Jeremy Wade, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/986,308

(22) Filed: Dec. 31, 2015

(51) Int. Cl.
| | |
|---|---|
| H04B 7/00 | (2006.01) |
| G06Q 20/32 | (2012.01) |
| H04W 4/00 | (2009.01) |
| H04B 5/00 | (2006.01) |
| H04W 4/02 | (2009.01) |

(52) U.S. Cl.
CPC ....... G06Q 20/3278 (2013.01); H04B 5/0031 (2013.01); H04W 4/005 (2013.01); H04W 4/008 (2013.01); H04W 4/021 (2013.01)

(58) Field of Classification Search
CPC . G06Q 20/3278; H04B 5/0031; H04W 4/005; H04W 4/008; H04W 4/021
USPC ...................... 455/41.1, 41.2, 41.3
See application file for complete search history.

(56) References Cited

U.S. PATENT DOCUMENTS

| | | | | |
|---|---|---|---|---|
| 9,396,368 | B1 * | 7/2016 | Lamba | G06K 7/10148 |
| 2005/0287966 | A1 * | 12/2005 | Yoshimi | H04W 52/52 455/127.1 |
| 2010/0277003 | A1 * | 11/2010 | Von Novak | H02J 17/00 307/104 |
| 2011/0086601 | A1 * | 4/2011 | Ali | H01Q 1/243 455/121 |
| 2012/0086284 | A1 * | 4/2012 | Capanella | H03H 7/40 307/104 |
| 2012/0095867 | A1 * | 4/2012 | McKelvey | G06Q 20/322 705/26.41 |
| 2014/0061301 | A1 * | 3/2014 | Cho | G06Q 20/3567 235/380 |
| 2014/0279546 | A1 * | 9/2014 | Poole | H04B 5/0031 705/44 |
| 2016/0050629 | A1 * | 2/2016 | Khesbak | H04W 52/0261 455/574 |
| 2016/0147239 | A1 * | 5/2016 | Yan | G05F 1/575 323/280 |

* cited by examiner

Primary Examiner — Md Talukder
(74) Attorney, Agent, or Firm — Polsinelli PC

(57) ABSTRACT

A payment object reader configured to read data from NFC or EMV enabled payment objects. The payment device includes a NFC antenna, a boost converter (voltage regulator) chip. A first feedback circuit is connected to the NFC antenna and the feedback pin of the boost converter chip. The boost converter chip regulates a first voltage provided to the NFC antenna for the NFC antenna to modulate a field. A second feedback circuit includes a microcontroller with an ADC input and a DAC output. ADC input is connected to NFC antenna, and DAC is connected to the feedback pin of the boost converter chip. The microcontroller receives the voltage at the ADC input and controls the DAC output to transition based on the value of the ADC input.

22 Claims, 9 Drawing Sheets

FEEDBACK CONTROL LOOP FOR NFC TRANSMITTER VOLTAGE CONTROL

BACKGROUND

A payment object reader can be configured to automatically read data from an integrated circuit (IC) chip payment object that has been inserted in the payment object slot of the payment object reader, or from a near field communication (NFC) enabled payment object proximate a NFC antenna of the payment object reader. When the payment object reader detects the presence of the integrated circuit payment object in the payment object slot, a voltage is applied to the integrated circuit payment object in order for the payment object reader to read data from the integrated circuit payment object. However if the system of the payment object reader or other factors affect the voltage applied to one or more components of the payment object reader, synchronization and reading errors can occur. Likewise, when the presence of a NFC enabled payment object is detected proximate a NFC antenna, a voltage is applied to the NFC antenna to modulate a field to read data from the NFC enabled payment object.

BRIEF DESCRIPTION OF THE DRAWINGS

The disclosure below refers to the accompanying drawings which are provided for the purpose of illustration only to depict example embodiments of the disclosure and are not therefore to be considered to be limiting of its scope. The principles herein are described and explained with additional specificity and detail through the accompanying drawings in which.

DETAILED DESCRIPTION

System, devices, methods, and non-transitory computer-readable media are disclosed in accordance with various embodiments of the present disclosure overcome one or more of the above-referenced and other deficiencies in conventional approaches to payment object reader systems. In particular, in accordance with various embodiments, approaches provide for a dual feedback mechanism for a boost converter integrated circuit (IC) chip that provides power to one or more components of a payment device.

A payment object reader, or other payment device, is configured to read data from a payment object, such as a NFC enabled payment object, an IC chip (e.g., EMV) enabled payment object, or a magnetic stripe payment card. The payment device includes a NFC antenna, a boost converter chip having a voltage output pin connected to the NFC antenna and a feedback pin connected to a first feedback circuit. The boost converter IC chip regulates the voltage provided to the NFC antenna to modulate a field and read data from NFC enabled payment objects. A second feedback circuit includes a microcontroller with an analog-to-digital converter (ADC) input and a digital-to-analog converter (DAC) output. The ADC input is connected to the NFC antenna, and the DAC output is connected to the boost converter feedback pin via a transistor and a resistor divider. The microcontroller receives the voltage at the ADC input and controls the DAC output to transition based on the value of the ADC input. The DAC output voltage can be set to one of two pre-selected values, or can change with respect to the ADC input voltage. This allows for an otherwise single-output voltage to be monitored, changed and otherwise controlled via the second feedback circuit that uses an analog control element.

Other advantages, variations, and functions are described and suggested below as can be provided in accordance with the various embodiments.

As used herein, a financial transaction is a transaction that is conducted between a customer and a merchant at a point-of-sale. When paying for a financial transaction, the customer can provide the merchant with cash, a check, or a debit or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

Figure 1:
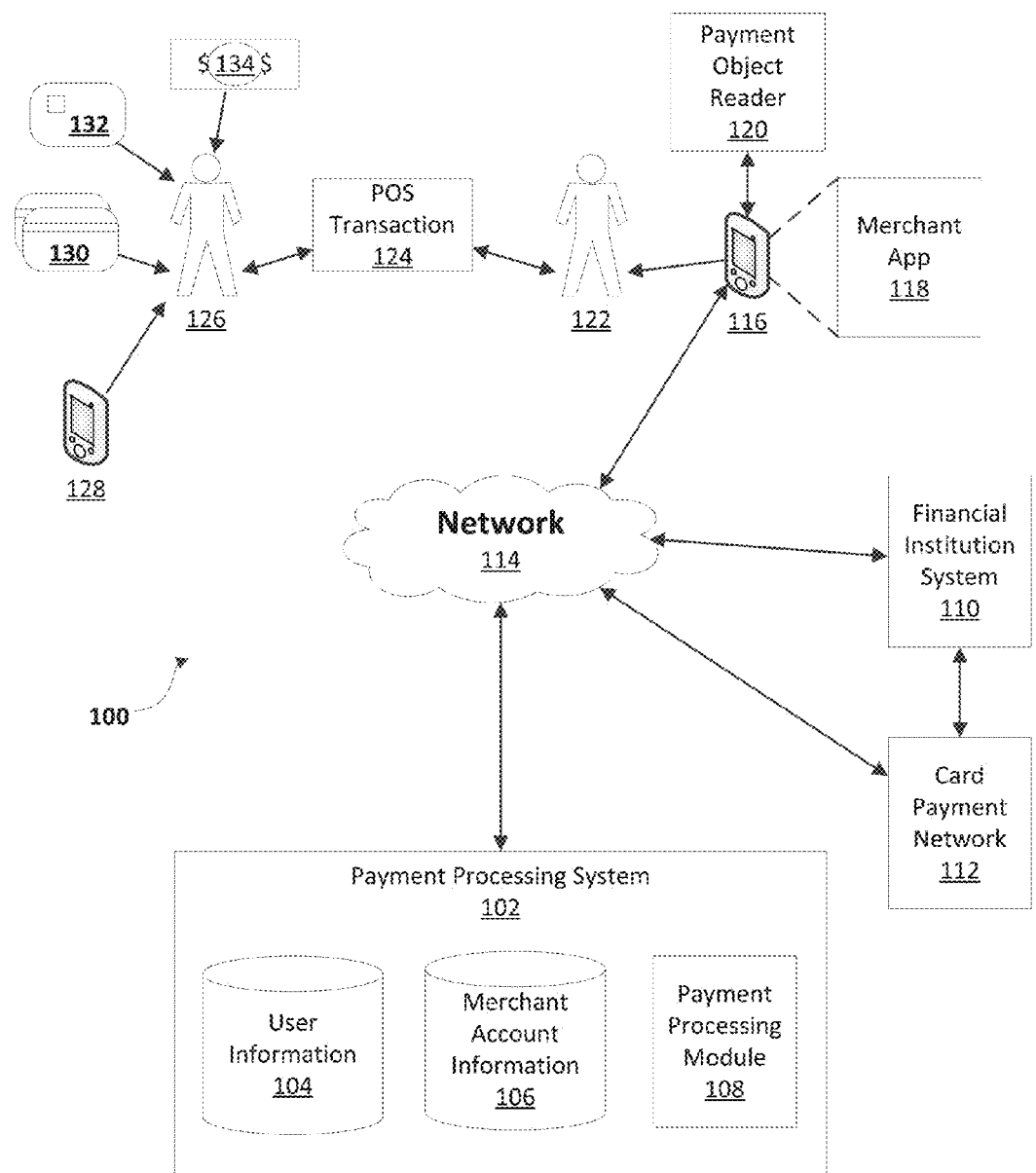
FIG. 1 illustrates an example architecture of a payment communication system for enabling transactions between merchants and buyers.

FIG. 1 illustrates an example architecture of payment communication system 100 for enabling point-of-sale (POS) transactions between merchants 122 and buyers 126. In the example of FIG. 1, buyer 126 can use any of a variety of payment objects, such as payment cards 130, 132 or cash 134 when participating in POS transaction 124 with a merchant 122. A buyer 126 can typically have payment cards 130, 132 such as credit cards, debit cards, prepaid cards, and the like, that buyer 126 can use for conducting POS transaction 124. In some embodiments, payment cards 130 can include one or more magnetic stripes for providing payment object and buyer information when swiped in a payment object reader 120 communicatively coupled to merchant device 116. In some embodiments, other types of payment objects can be used, for example smart cards 132 having a built in integrated circuit including a memory chip (e.g. EMV payment objects), a radio frequency identification tag (e.g. near field communication enabled objects), and the like. In some embodiments, user 126 can use user device 128 to conduct NFC payment transactions through communication between the user device 128 and the payment object reader/transmitter device 120.

The payment communication system 100 in the example of FIG. 1 illustrates a merchant device 116 associated with the merchant 122 that participates in the payment service provided by the service provider of payment processing system 102. The merchant device 116 can be a computing device (e.g., a mobile computing device) able to communicate with the payment processing system 102, and with various other computing devices, through suitable communication protocols, interfaces, and networks, including network 114. Further, the merchant device 106 can be any appropriate device operable to send and receive requests, messages, or other types of information over the network 114. Additionally, while only a single merchant device 116 is illustrated in the example of FIG. 1, in some embodiments there can be additional merchant devices depending on the number of merchants participating in the payment service, or a plurality of components arranged as a POS system.

Merchant device 116 can include an instance of a merchant application 118 executed on merchant device 116. Merchant application 118 can provide POS functionality to enable the merchant 122 to accept payments at a POS location using merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that merchant 122 operates a food truck, is a street vendor, a cab driver, or has an otherwise mobile business, e.g., in the case of merchants who sell items at buyers' homes, buyers' places of business, etc.

Merchant device 116 is communicatively coupled to a payment object reader 120, either by direct connection, for example through an audio jack of the mobile phone connected to an audio plug of the payment object reader, or through wireless connection, such as WiFi, BlueTooth, BLE (Bluetooth low energy), NFC, or other appropriate short-range communication. Short-range communication as used herein refers to communication protocols having a generally short range of communication (less than 100 meters in some embodiments), such as NFC communication, RFID (radio frequency identification) tags, or Wi-Fi, etc. The payment object reader can read data from a magnetic stripe card or an EMV chip-type card and communicate the data to merchant device 116. The payment object reader can also read data from an NFC device and communicate the data to merchant device 116.

Accordingly, merchant 122 and buyer 126 can conduct a POS transaction 124 by which buyer 126 acquires an item or service from merchant 122 at a POS location. The merchant application 118 on merchant device 116 can send transaction information to payment processing system 102, e.g., as the transaction is being conducted at the POS location. In some embodiments, such as if a particular merchant device 116 is not connected to the network 114 and is therefore processing transactions offline, the transaction information can be sent in a batch at a subsequent point in time or using other suitable techniques. In some embodiments, the transaction information can be sent via SMS, MMS, or a voice call.

In some embodiments, payment processing system 102 is configured to send and receive data to and from the user device and merchant device 116. For example, the payment processing system 102 can be configured to send data describing merchants to the user device using, for example, the information stored in the merchant account information database 106. The data describing merchants can include, for example, a merchant name, geographic location, contact information, and an electronic catalogue, e.g., a menu that describes items that are available for purchase from the merchant.

In some embodiments, payment processing system 102 can also be configured to communicate with a computer system of card payment network 112, e.g., MasterCard®, VISA®, etc., over the network, or over a different network, for example, to conduct electronic financial transactions. The computer system of the card payment network can communicate with a computer system of financial institution system 110, e.g., a bank. There can be computer systems of other entities, e.g., the card acquirer, between payment processing system 102 and the computer system of the card issuer.

Payment processing system 102 can then communicate with the computer system of a card payment network 112 to complete an electronic financial transaction for the total amount to be billed to the customer's financial account. Once the electronic financial transaction is complete, payment processing system 102 can communicate data describing the payment transaction to the user device, e.g., an electronic receipt, which can, for example, notify the customer of the total amount billed to the user for the payment transaction with the particular merchant.

In some embodiments payment processing system 102 can also include payment card profiles stored with user accounts in user information database 104. Such payment card profile can utilized for card-less payment transactions wherein a user 122 is not required to present a payment card, and instead can authorize the payment processing system to process a payment to a merchant using a device such as device 128.

The transaction information can include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer can sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

To accept electronic payments using the POS system 100, the merchant 122 typically creates a merchant account with payment processing system 102 by providing information describing the merchant including, for example, merchant name, contact information (e.g., telephone numbers, the merchant's address, and one or more financial accounts to which funds collected from buyers will be deposited). This merchant information can be securely stored by payment processing system 102, for example, as merchant account information 106 in a secure database. Further, the merchant information can include a merchant profile created for each merchant. The merchant profile can include information about merchant 122 and transaction information associated with transactions conducted by the merchant.

Payment processing system 102 enables a service provider to provide a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, card payment networks 112, and bank or other financial institution payment systems 110. Payment processing system 102 includes payment processing module 108 that receives transaction information for processing payments made through merchant application 118. For example, the payment processing module 108 can receive transaction information, such as an amount of the transaction, and can verify that particular payment card 130, 132 can be used to pay for the transaction, such as by contacting a card clearinghouse of card payment network 112. Furthermore, in some examples, payment processing module 108 can redirect payment information for transactions to be made using payment cards 130, 132 to a bank, or other financial institution system 110. In other embodiments, merchant device 116 can communicate directly with an appropriate card payment network 112 or financial institution system 110 for approving or denying a transaction using a particular payment card 130, 132 for a POS transaction 124.

As introduced above, payment processing system 102 can be configured to communicate with one or more systems of card payment network 112 (e.g., MasterCard®, VISA®, etc) over network 114 to conduct financial transactions electronically. Payment processing system 102 can also communicate with financial institution system 110 of a bank over network 114. For example, the payment processing system 102 can communicate with an acquiring bank, a payment card issuing bank, and/or a bank maintaining buyer accounts for electronic payments. In some embodiments, financial institution system 110 can include one or more bank payment systems 110 of one or more banks.

A payment card acquiring bank can be a registered member of a card association (e.g., Visa®, MasterCard®, etc), and can be part of card payment network 112. A payment card issuing bank can issue payment cards 130 and 132 to buyers 126, and can pay acquiring banks for purchases made by cardholders to which the issuing bank has issued payment card 130 and 132. Accordingly, in some embodiments, the systems of an acquiring bank can be included in the card payment network 112 and can communicate with systems of a payment card issuing bank to obtain payment. Further, in some embodiments, financial institution system 110 can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures and thus, the foregoing are merely several examples.

Network 114 can be a conventional type, wired or wireless, and can have numerous different configurations including a star configuration, token ring configuration, or other configurations. Furthermore, network 114 can include an intranet, a local area network (LAN), a wide area network (WAN) (e.g., the Internet), and/or other interconnected data paths across which multiple devices can communicate. In some embodiments, network 114 can be a peer-to-peer network. Network 114 can also be coupled with or include portions of a telecommunications network for sending data using a variety of different communication protocols. In some embodiments, network 114 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device, payment processing system, card payment network, and bank, more than one network 114 can connect these entities. The payment system, the merchant device, and the user device can communicate over the network using wired or wireless connections, or combinations thereof.

In some embodiments, payment processing system 102 is configured to accept card-less payment transactions from customers (e.g. customer 126). As used herein, a card-less payment transaction is a transaction conducted between the customer and a merchant at the point-of-sale during which a financial account of the customer is charged without the customer having to physically present a financial payment card to the merchant at the point-of-sale. In some forms of card-less payment transactions, the merchant receives at the point-of-sale details of the financial account via mobile device 128 presenting payment information to merchant 122 by communicating with payment object reader 120, e.g. NFC transactions. In other forms of card-less payment transactions, the merchant need not receive any details about the financial account at the point-of-sale, e.g., the credit card issuer or credit card number, for the transaction to be processed. Instead, such details can be stored at user information 104 of payment processing system 102 and provided to merchant 122 (such card-less payment transactions herein are referred to as card-on-file transactions). Generally, when a customer and a merchant enter into an electronic financial transaction, the transaction is processed by transferring funds from a financial account associated with the user account to a financial account associated with the merchant account.

Before conducting card-less payment transactions of the type that does not require that the merchant POS receive financial account details from customer 126 (e.g. card-on-file transactions), the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

As used herein, the term "payment card," "payment object," or "payment instrument" refers to a payment mechanism which includes a debit card, a conventional credit card, "smartcards" that have embedded circuits, such integrated circuit (IC) cards (e.g., Europay-MasterCard-Visa (EMV) cards), and NFC enabled payment cards, or any wallet-size card which functions as a combination of any of these payment mechanisms. In some embodiments, a payment card, payment object, or payment instrument can also include a virtual payment card stored on a device such as a smart phone or other device and transmittable, for example, via near field communication (NFC) or other suitable means.

Figure 2:
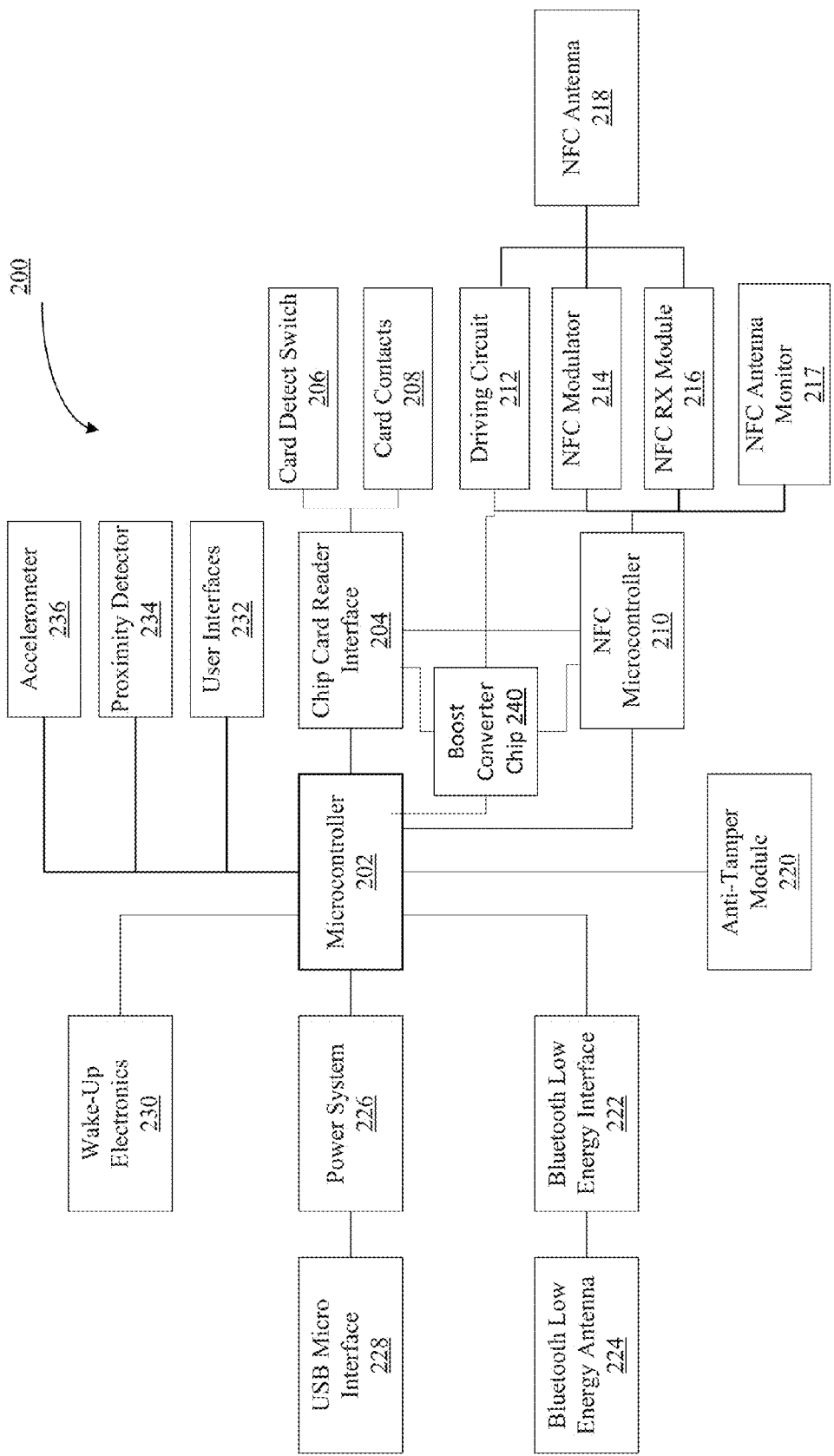
FIG. 2 illustrates an example block diagram of a payment object reader for performing transactions between merchants and buyers.

FIG. 2 illustrates a payment object reader/transmitter device 200 in accordance with at least some embodiments of the present invention. Payment device 200 includes microcontroller 202 configured to manage functions between various components within the device. Coupled to microcontroller 202 is integrated circuit payment object interface 204. Integrated circuit payment object interface 204 is connected to payment object detect switch 206 and payment object contacts 208. Payment object contacts 208 is configured to provide electrical connectivity between the contact pads of an integrated circuit enabled payment object and integrated circuit payment object interface 204. Furthermore, payment object detect switch 206 is configured to indicate when a payment object is inserted into payment device 200. Payment object detect switch 206 may be any suitable switch, electrical, mechanical, or otherwise, and in some embodiments may be integrated with payment object contacts 208. In situations where payment object detect switch 206 indicates that a payment object has been inserted into payment device 200, integrated circuit payment object interface 204 creates a pathway between microcontroller 202 and payment object contacts 208. As such microcontroller 202 can read data from the payment object contacting payment object contacts 208.

Figure 3:
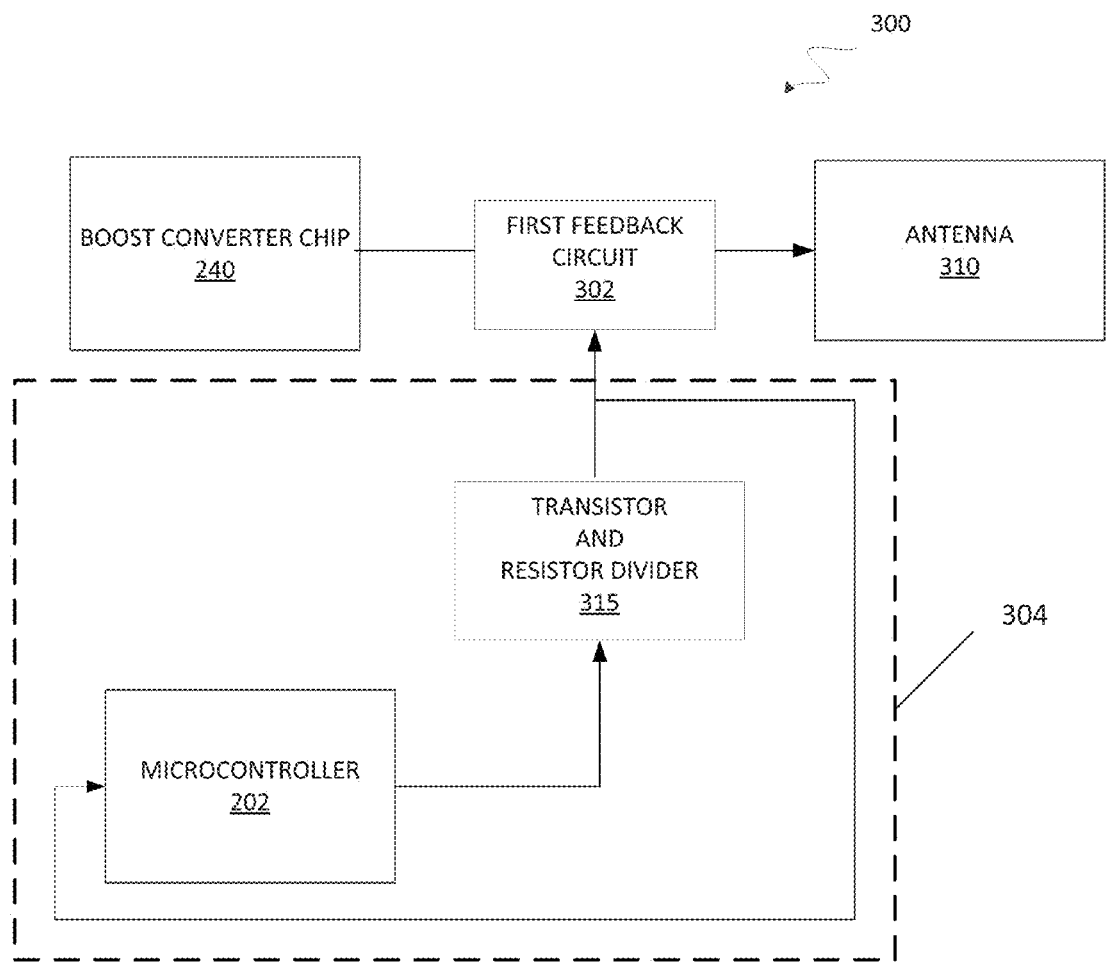
FIG. 3 illustrates an example block diagram of the payment device including a first feedback circuit and a second feedback circuit.

In some situations, microcontroller 202 monitors and determines that the various components and subsystems of payment device 200 is not ready to read a payment object in contact with payment object contacts 208. In such situations, microcontroller 202 can delay the reading of the payment object in contact with payment object contacts 208. FIG. 3 illustrates a generalized schematic view of the components used to carry out this function.

In some embodiments, microcontroller 202 transmits the data read from the payment object contacting payment object contacts 208, by using the NFC antenna 218 under the control of the NFC microcontroller 210.

Payment device 200 may also include a near field communication (NFC) microcontroller 210. NFC microcontroller 210 is configured to manage the transmission and reception of near field communications through control of driving circuit 212, NFC modulator 214, NFC RX module 216, NFC antenna monitoring circuit 217, and NFC antenna 218. In some embodiments, driving circuit 212 may include an H-bridge, an amplifier, a filter and/or a matching circuit. A switch 213 can be coupled on a first pole of the switch to the antenna 218 and on the second pole to the driving circuit, such that when the device is in the first receiver mode, the switch 213 is closed and the antenna is driven by the driving circuit. When switch 213 is open, the antenna 218 is not driven by driving circuit 212 and operates in a transmission mode. In some embodiments, switch 213 can be replaced with a switch within driving circuit 212, such as a JFET or MOSFET switch under the control of the microcontroller 202 or NFC microcontroller 210. Furthermore, in some embodiments NFC RX module 216 may include an op-amp, a filtering and conditioning circuit and/or a rectifier, such as a full wave bridge rectifier. Additionally, NFC modulator 214 may be, for example, a type-B modulator. In instances where it is desired to read a NFC enabled payment object, or a NFC enabled payment object is determined to be in proximity to payment device 200, NFC microcontroller 210 may be configured to drive NFC antenna 218 via driving circuit 212 to induce a magnetic field capable of being modulated by the NFC enabled payment object. From here, the modulated magnetic field signal may be converted into a digital signal that NFC microcontroller 210 can interpret via NFC RX module 216. On the other hand, when it is desired to transmit data via NFC antenna 218, NFC microcontroller 210 may be configured to disable driving circuit 212 and transmit data using the NFC protocol by instructing NFC modulator 214 to modulate the magnetic field to which NFC antenna 218 is operatively coupled. In some embodiments, there can be a switch within NFC modulator 214 to turn on or off the load applied to the antenna. The switch can be under the control of microcontroller 202. In some embodiments NFC antenna 218 can drift from a desired frequency (become detuned). This can be the result of a metal object being in the proximity of device 200. The NFC antenna monitor 217 can monitor the frequency of NFC antenna 218, and determine when the frequency of NFC antenna 218 has drifted away from the desired frequency. When it is determined that NFC antenna 218 is out of tune, NFC antenna monitor circuit 217 can work in concert with NFC microcontroller 210 to vary one or parameters such as capacitance, voltage, or impedance of NFC antenna 218 to tune NFC antenna 218.

Microcontroller 202 receives payment data read by integrated circuit payment object interface 204 via payment object contacts 208, or alternatively from a magnetic stripe reader reading payment data from a magnetic stripe card. The payment data received at microcontroller 202 is stored, either temporarily or permanently, in memory of payment device 200. The payment data stored in memory can then be transmitted via NFC antenna 218. In some embodiments, microcontroller 202 can receive and permanently store payment information so that payment device 200 acts as a payment object that does not require a payment card or other payment object to be present. Payment device 200 is capable of communicating using Bluetooth, and is thus able to pair with a mobile device to obtain payment object information from a phone that has Bluetooth capabilities but does not have NFC payment capabilities.

To supply power to the components within payment device 200, power system 226 is provided. In some embodiments, power system 226 may include a battery. Coupled to power system 226 is USB micro interface 228 configured to receive a USB micro jack, although other types of connectors may be utilized. In certain embodiments, connection of a jack to USB micro interface 228 can activate a switch within power system 226 to override power supplied by the battery. This allows for battery power to be conserved for situations where external power cannot be provided. Furthermore, power system 226 may also include a battery charger to allow the battery to be charged when external power is supplied via USB micro interface 228. Payment device 200 also includes wake-up electronics 230 configured to wake-up payment device 200 from a low-power state to an active state in response to detection of a payment object. In some embodiments, wake-up electronics 230 can also power down payment device 200 to a low-power state after a predetermined amount of time or after completion of a communication.

Payment device 200 illustrated in FIG. 2 further contains a Bluetooth low energy (BLE) interface 222 and a BLE antenna 224 to enable Bluetooth communications. In addition, payment device 200 includes anti-tamper module 220 configured to prevent unauthorized tampering with the device and possible theft or interception of payment information. In certain embodiments, anti-tamper module may include a wire mesh enclosed within payment device 200.

Payment device 200 also includes user interfaces 232 to enhance the user experience. User interfaces 232 can include, but are not limited to, LED indicators, buttons and speakers. In some embodiments, speakers and LED indicators can be used to present audio and visual identifiers of transaction and device status. In addition, buttons may be configured to power payment device 200 on or off, operate the device or reset the device.

Payment device 200 also includes sensors. As illustrated in FIG. 2, the example sensors are useful in informing device 200 about its current environment, use, or state. Accelerometer 236 can be used to detect motion of the device 236. In some embodiments, detected motion (acceleration), or lack of detected motion can be interpreted by microcontroller 202 to conclude that payment device 200 is stationary; was stationary and is now in motion, which may indicate it is being moved toward a customer; was in motion and now is stationary, which may indicate that the device is now in a new environment, and the tuning of NFC antenna 218 should be checked; or quick changes in motion might indicate the device is in a merchant's pocket, and the device can go into standby mode.

Similarly, proximity detector 234, can be used to determine that a payment object is coming within range of the antenna, which can be used to activate the integrated circuit payment object interface 204 or power up or increase power output to NFC antenna 218. In some embodiments, proximity detector 234 can be useful in determining that a payment object is too close to the NFC antenna 218 and is causing NFC antenna 218 to be detuned.

In other embodiments, increasing the overall voltage for driving circuit 217 can tune the detuned antenna 218.

The payment device 200 can include a boost converter chip 240 that regulates the voltage provided to the NFC microcontroller 210 and the chip card reader interface 204. This can be used, for example, to regulate the amount of power that is sent to the NFC antenna 218 to modulate a field produced by the NFC antenna. When performing a NFC transaction using the NFC antenna, the desired operating range in between approximately 5V and 9V. If the payment object, such as a NFC-enabled payment card, is very close to the NFC antenna, it is desirable to reduce the voltage supplied to the NFC antenna so that the card is not overloaded. Likewise, when the payment object is further away from the payment device 200, the voltage can be increased to modulate a stronger field proximate the NFC antenna. The microcontroller 202 is able to, in real time, adjust the output of the boost converter chip 240. As described in greater detail hereinbelow, the microcontroller has an analog-to-digital converter (ADC) input and a digital-to-analog (DAC) output. Through the ADC input, the microcontroller 202 can measure the voltage that is being output to the NFC antenna 218. So the ADC knows the voltage, relative to its own voltage as a reference, and can control the DAC output to provide any desired output. By feeling the measured voltage back into the ADC, an absolute measurement of the voltage is available and the microcontroller can increase or decrease the DAC value as needed in order for the desired value to be achieved at the ADC. In an example embodiment, the microcontroller can measure the voltage in an increment of a predetermined amount of time, such as every 50 milliseconds (ms), and adjust the DAC accordingly. Thus, an analog control element is added that is driven by a DAC, to manipulate the feedback ratio and then measure the output voltage to ensure it is accurate.

Reference is now made to FIG. 3 illustrating an example block diagram of the payment device, including a first feedback circuit and a second feedback circuit. The payment device 300 includes the boost converter chip 240 and microcontroller 202. The first feedback circuit 302 is connected at a first terminal to the NFC antenna 310 and to the boost converter chip 240 at a second terminal. The second feedback circuit 304 includes the microcontroller 202 having an output connected to the boost converter IC chip feedback pin by a line having a transistor and a resistor divider 315 therein. The second feedback circuit 304 is configured to feed voltage from the NFC antenna to the microcontroller through an input. The microcontroller controls the output to the transistor based on the voltage from the NFC antenna 310. In this manner, the microcontroller is configured to control the amount of power provided to the NFC antenna by the boost converter IC chip such that the boost converter IC chip can be controller to output the first voltage and a second voltage as determined by the microcontroller. By monitoring and controlling the voltage, the microcontroller 202 can account for factors affecting accuracy of the second voltage caused by signal drift from a desired output signal value due to temperature effects at the transistor.

Although shown and described with reference to a NFC antenna, the teachings herein are likewise applicable to a boost converter chip that is used to control the amount of power that is supplied, depending upon the type of transaction. For example, the dual feedback circuits disclosed herein can be used to determine the amount of voltage provided by a power supply to a NFC antenna or a chip card interface. Additionally, although a boost converter chip is shown and described, any appropriate voltage regulator can be used that provides appropriate feedback and monitoring.

Figure 4:
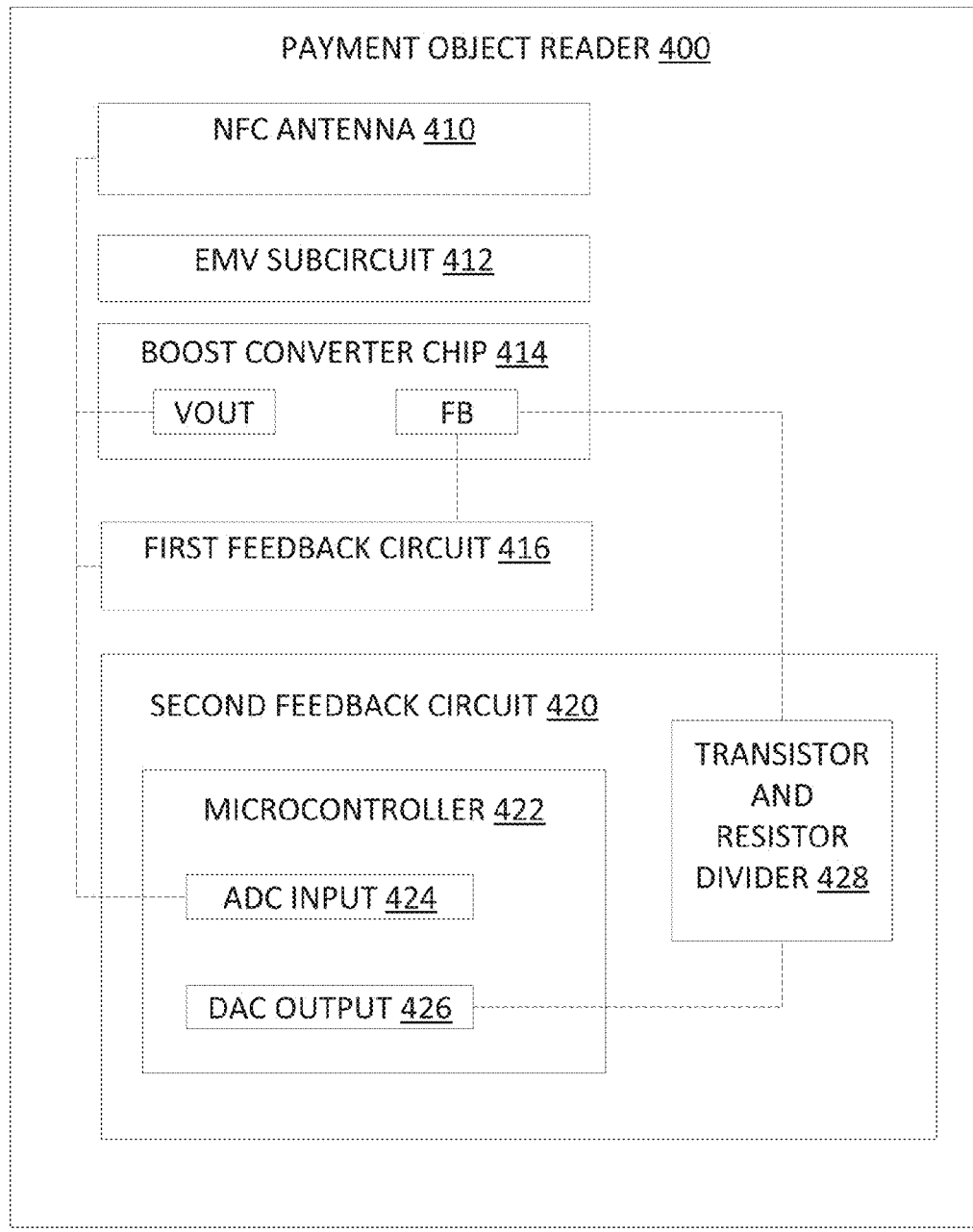
FIG. 4 illustrates an example diagram for the payment device and the components thereof.

Reference is now made to FIG. 4 showing a block diagram of a payment object reader, also referred to herein as a "payment device" and the components thereof. The payment object reader 400 includes a NFC antenna 410 for reading data from NFC-enabled payment objects, and a EMV subcircuit 412, which can include the appropriate interfaces and contacts for reading data from integrated chip (IC) payment objects. A boost converter chip 414 regulates the amount of power provided to the NFC antenna 412 and the EMV subcircuit 412. The boost converter chip has a feedback pin connected to a first feedback circuit 416. The first feedback circuit 416 is also connected to the boost converter IC chip feedback pin.

A second feedback circuit 420 includes a microcontroller 422 having an analog-to-digital converter (ADC) input 424 and a digital-to-analog converter (DAC) output 426. The ADC input 424 is connected to the NFC antenna. The DAC output 426 is connected to the feedback pin via a transistor and resistor divider 428. By providing a transistor in a resistor divider 428, the bottom resistor value can be changed, thereby changing the output. The output of the overall transistor and resistor divider can thus be changed through the DAC output. The microcontroller 422 has a DAC output 426 that is red through the resistor. As the DAC value increases, this will begin to conduct, and the transistor will add more resistance in parallel with the resistor, and thus reduces the ratio and will cause the voltage to change based on what is observed at the feedback pin of the boost converter chip 414. In this manner, we are able to have more than one output. For example, for EMV cards, the desired output is approximately 5V. However, for NFC-enabled transactions, the desired output is in the range of 5V to 9V, depending upon the location of the payment object.

The microcontroller can control the DAC output 426 to the transistor based on the voltage from the NFC antenna as received at the ADC input 424. The microcontroller can control the amount of power provided to the NFC antenna by the boost converter IC chip. The boost converter IC chip can thus be controller to output the first voltage, which is the same as the measured voltage, or a second voltage, as determined by the microcontroller. The microcontroller can thus account for factors affecting accuracy of the second voltage caused by signal drift from a desired output signal value due to temperature effects at the transistor. The first voltage and the second voltage can be two pre-selected voltage values, for example where one condition causes a first voltage and a second condition causes a second voltage, where the voltage is a specific voltage value, such as 5V and 9V. The second voltage can also be a voltage that is relative to the first voltage, such as a voltage that is higher or lower than the first voltage, depending upon the software implemented by the microcontroller.

Various software techniques for changing the DAC value depending upon the ADC value, and thus providing a second voltage as compared to a first voltage, can also include an averaging technique, where an average is determined over time, and the DAC is adjusted accordingly based on an average value; a histogram technique, where a histogram is used to determine an appropriate DAC value; use of an accurate voltage reference, where the ADC value is compared to an absolute value, and the DAC is adjusted accordingly; a linear compensation technique, where the DAV value is adjusted linearly each time the ADC value adjusts, and for the same value; maintaining a lookup table, where each ADC value has an associated DAC value stored in the lookup table that is used for the DAC output; and a zone compensation technique, where a DAC value is assigned to each of a zone of ADC input values. Other software techniques in accordance with ordinary skill should be apparent to provide a DAC output that varies the voltage depending upon the measured ADC input value.

Figure 5:
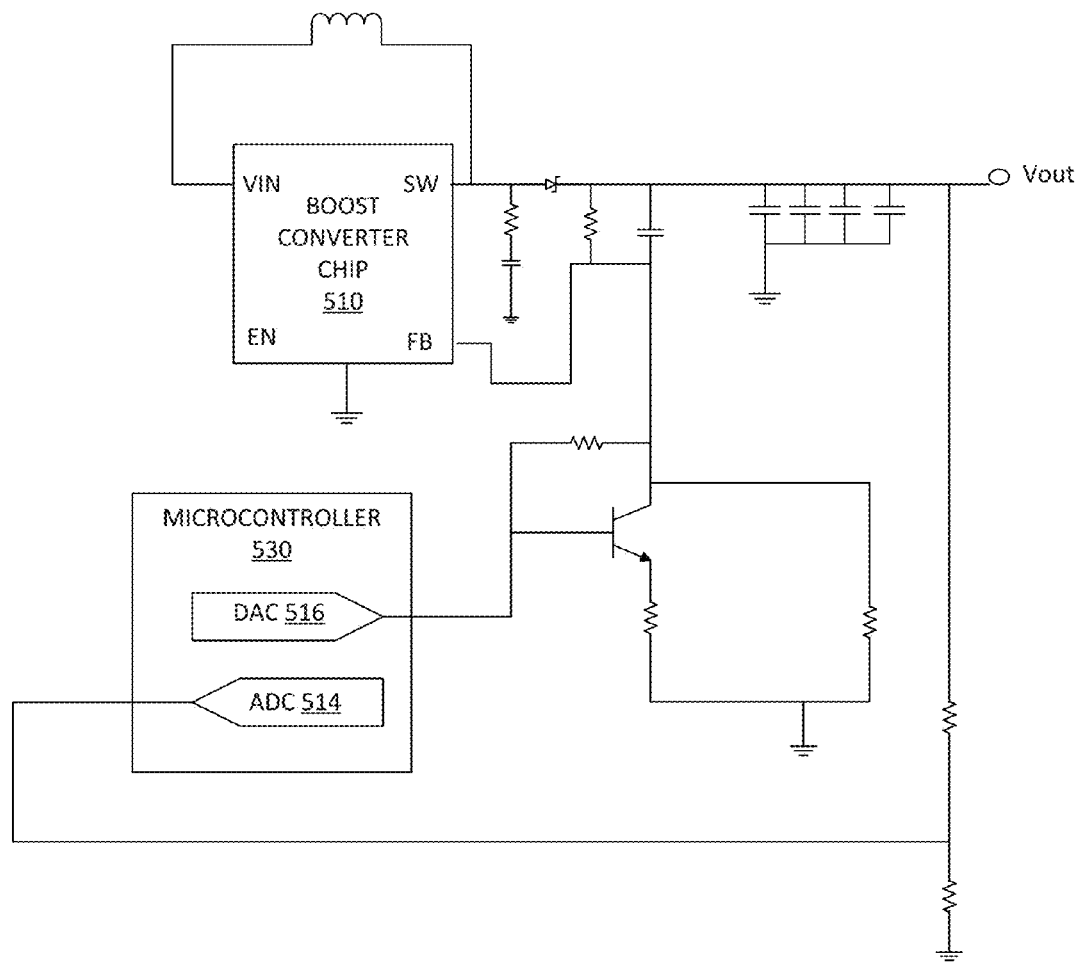
FIG. 5 illustrates a detailed example circuit for the payment device including the first feedback circuit and the second feedback circuit for controlling an amount of power provided.

Reference is now made to FIG. 5 showing a detailed example circuit of a payment device, the example circuit shown including a boost converter chip, a first feedback circuit and a second feedback circuit including a microcontroller with an ADC input and a DAC output. The boost converter chip 510 can be any appropriate voltage regulator chip, such as the LMR62421 Voltage Regulator provided by Texas Instruments, available in 5-Pin SOT-23 or 6-PIN WSON. The schematic diagram of FIG. 5 incldes the 5-PIN voltage regulator, including a SW (switch node) pin, for connecting the output; GND (ground) for the signal and power ground pin; FB (feedback pin) for the feedback; EN (shutdown control input); and VIN (supply voltage for power stage, and input supply voltage). The boost converter chip 510 has a voltage output pin (SW) connected to the NFC antenna, illustrated as Vout in the schematic diagram. The boost converter chip 510 includes the feedback pin (FB) connected to a first feedback circuit, which is connected to the NFC antenna. A second feedback circuit includes a microcontroller 530 having an ADC input 514 and a DAC output 516. The ADC input is connected to the NFC antenna, and the DAC is connected to the boost converter IC chip feedback pin by a line including a transistor and a resistor divider. The second feedback circuit is configured to feed voltage from the NFC antenna to the microcontroller through the ADC input, and control the DAC output to the transistor based on the voltage from the NFC antenna as received at the ADC input. In this manner, the microcontroller is configured to control the amount of power provided to the NFC antenna by the boost converter IC chip such that the boost converter IC chip can be controlled to output the first voltage and a second voltage as determined by the microcontroller 530. The microcontroller 530 can account for factors affecting accuracy of the second voltage caused by signal drift from a desired output signal value due to temperature effects at the transistor.

By providing the transistor in the second feedback circuit, the ratio of the resistor divider can be changed using the DAC output of the microcontroller. The microcontroller 530 has a DAC output 516 that is fed through a resistor. As the DAC value goes up, this will begin to conduct, and the transistor will add more resistance in parallel with this resistor, and thus reduces the radio and will cause the voltage to change based on what is observed at the feedback pin.

Figure 6:
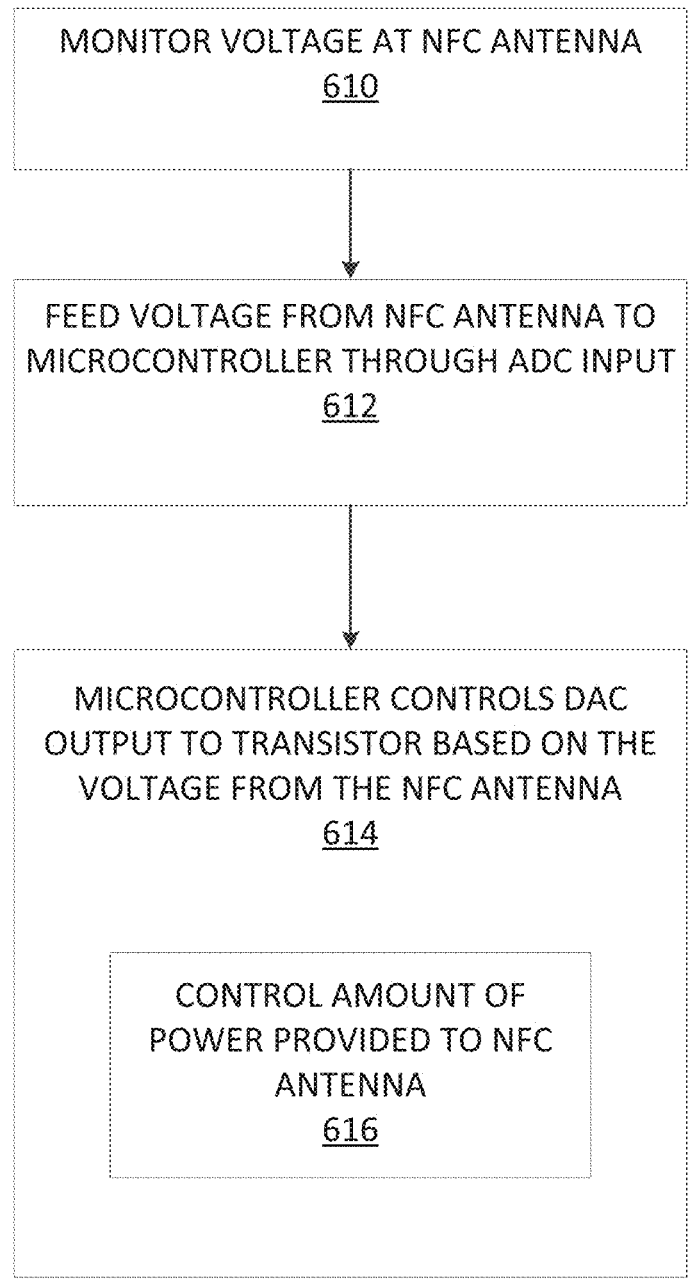
FIG. 6 is an example flow chart of the overall procedure for controlling power provided from a boost converter integrated circuit (IC) chip.

Reference is now made to FIG. 6 showing a flow chart of an example procedure for controlling power provided from a voltage regulator chip. At 610, the voltage of the NFC antenna is monitored at a feedback pin of the boost converter chip in a first feedback circuit. The voltage from the NFC is fed, by a second feedback circuit at 612, from the NFC antenna to the microcontroller through a ADC input. At 613, the microcontroller controls the DAC output to the transistor based on the voltage from the NFC antenna, as received at the ADC input. At 616 the microcontroller controls the amount of power provided to the NFC antenna by the boost converter chip. In this manner, the boost converter chip can be controller to output the first voltage and a second voltage as determined by the microcontroller, and the microcontroller can account for factor affecting accuracy of the second voltage caused by signal drift from a desired output signal value due to temperature effects at the transistor.

Figure 7:
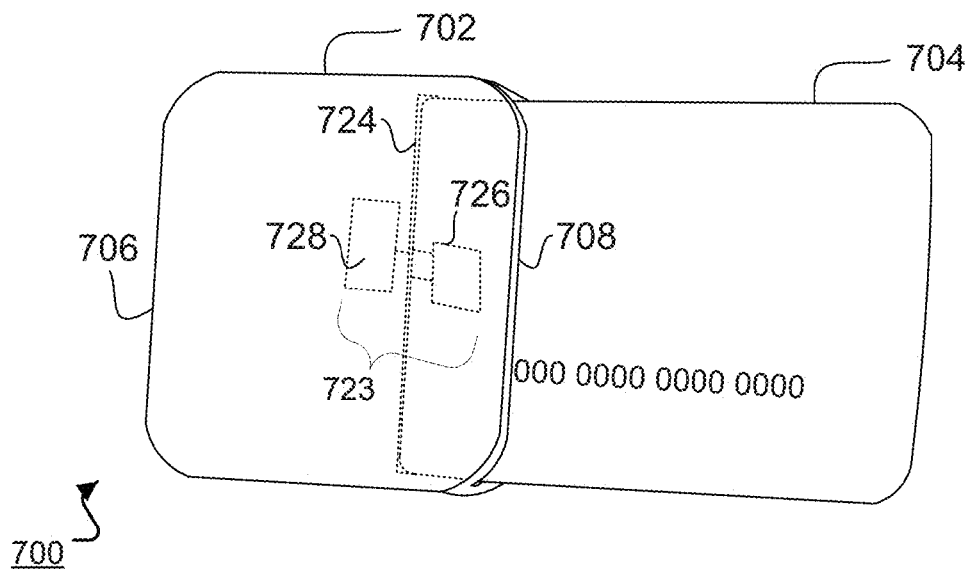
FIG. 7 is an example perspective view of a wireless payment object reader with a smart chip card being inserted.
Figure 8:
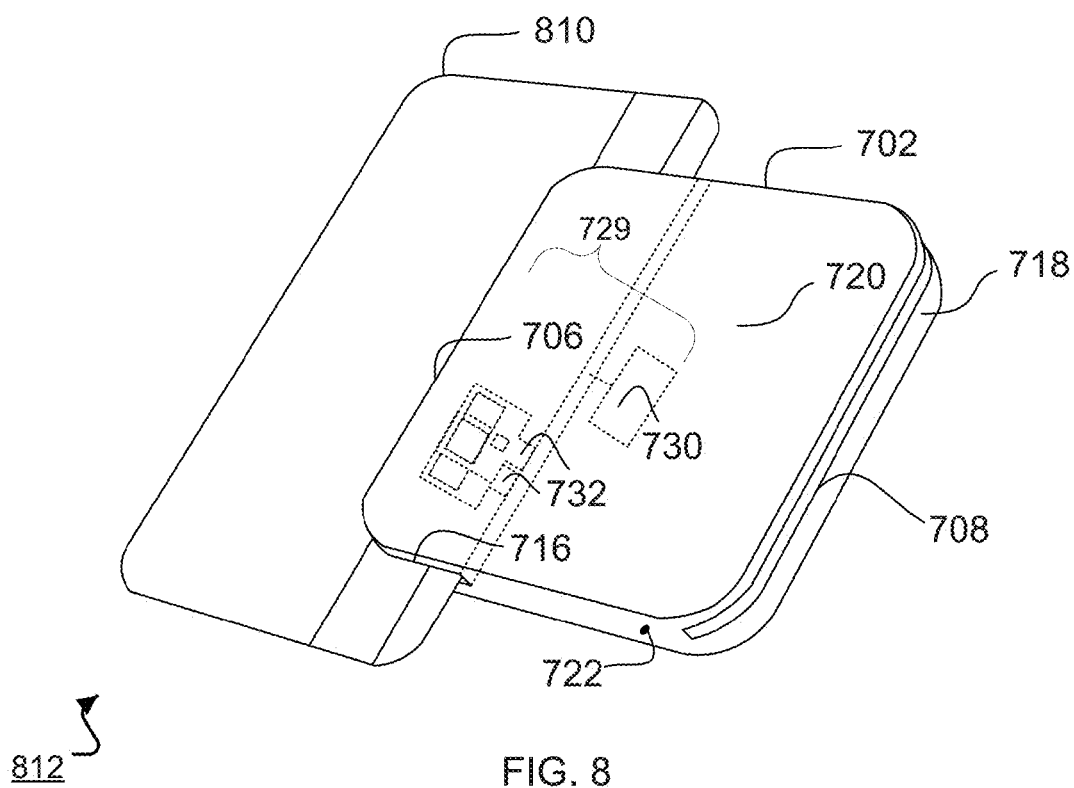
FIG. 8 is an example perspective view of a wireless payment object reader with a magnetic stripe card being swiped.

Reference is now made to FIGS. 7 and 8 showing example perspective views of a payment device. FIG. 7 is an example perspective view 700 of a wireless payment device 702 with a smart chip card 704 being inserted at a slot 708 of a chip payment object reader interface 723. FIG. 8 is an example perspective view 812 of a wireless payment object reader 702 with a magnetic stripe card 810 being swiped at a groove 706 of a magnetic stripe reader interface 729 that is opposite to the chip payment object reader interface 723. In some embodiments, the wireless payment device 700 may omit groove 706 and associated magnetic stripe reader interface 729, and provide a single slot 708 for receiving IC payment objects.

The wireless payment device 702 can have a frame that is configured to receive card insertions or card swipes. The frame can include a top surface 720, side surfaces 718, and a bottom surface 722. In the implementations shown in FIGS. 7 and 8, the wireless payment device 702 has a frame that is shaped as a thin parallelepiped, e.g., the width of the frame (along the top surface 720) is at least five or ten times the height (along the side surfaces 718). The top surface and bottom surface can be generally shaped as a square or rectangle, e.g., a square or rectangle with rounded edges.

The side surfaces 718 can include one or more openings that receive cards through, respectively, one or more card interfaces. The one or more card interfaces include circuitry, e.g., chip payment object reader circuitry 728 or magnetic stripe reader circuitry 730, configured to read data stored on the card. In some implementations, the wireless payment object reader has two openings on opposite sides of the frame, and a card interface within each opening. In some implementations, the wireless payment device has a single opening with one of the IC interface, or an MSR interface, or both in a same opening.

The wireless payment object reader 702 can include circuitry configured to direct signals from the one or more card interfaces, to communicate wirelessly with a computing device, and to efficiently power the wireless payment object reader 702. The one or more card interfaces of the wireless payment object reader 702 can include both a chip payment object reader interface 723 and a magnetic stripe reader interface 729. In some implementations, the interfaces are on opposite sides of the wireless payment object reader 702 as shown in FIGS. 7-8. In particular, the payment object reader 702 can include both a groove 706 on one side surface of the frame and a slot 708 on an opposite side surface of the frame. The groove 706 can extend across the entire width of the frame, and can be configured to receive a swipe of a magnetic stripe card. The magnetic stripe reader interface 729, including magnetic read heads 732 positioned to read the magnetic information on the stripe of the card as it is being swiped, are positioned in the groove 706. The slot 708 can extend across part, but not all of the width of the frame, leaving one or more thin side walls 724 to constrain the lateral position of a chip card as it is inserted into the slot 708. The chip payment object reader interface 723, including electrical contacts 726 positioned to electrically engage the contacts on the chip card when it is inserted, are positioned in the slot 708.

In some implementations, the interfaces are on the same side of the wireless payment object reader 702 and share an opening for receiving smart chip cards and magnetic stripe cards. In some implementations, a spring-loaded gate is included within the slot 808 of a chip payment object reader interface 723. The spring-loaded gate can be configured to engage the electrical contacts 726 with the contacts of a chip card when a chip card is inserted. On the other hand, the spring-loaded gate keeps the electrical contacts 726 recessed so a card being swiped does not engage with the electrical contacts 726.

In some implementations, the chip payment object reader interface 723 is configured to receive an external adapter through the electrical contacts 726. The external adapter can provide power to recharge the wireless payment object reader 702, e.g., by engaging the electrical contacts 726. The external adapter can connect the chip payment object reader interface 723 to a USB port or power supply. The external adapter can also provide software updates to the wireless payment object reader 702.

Figure 9:
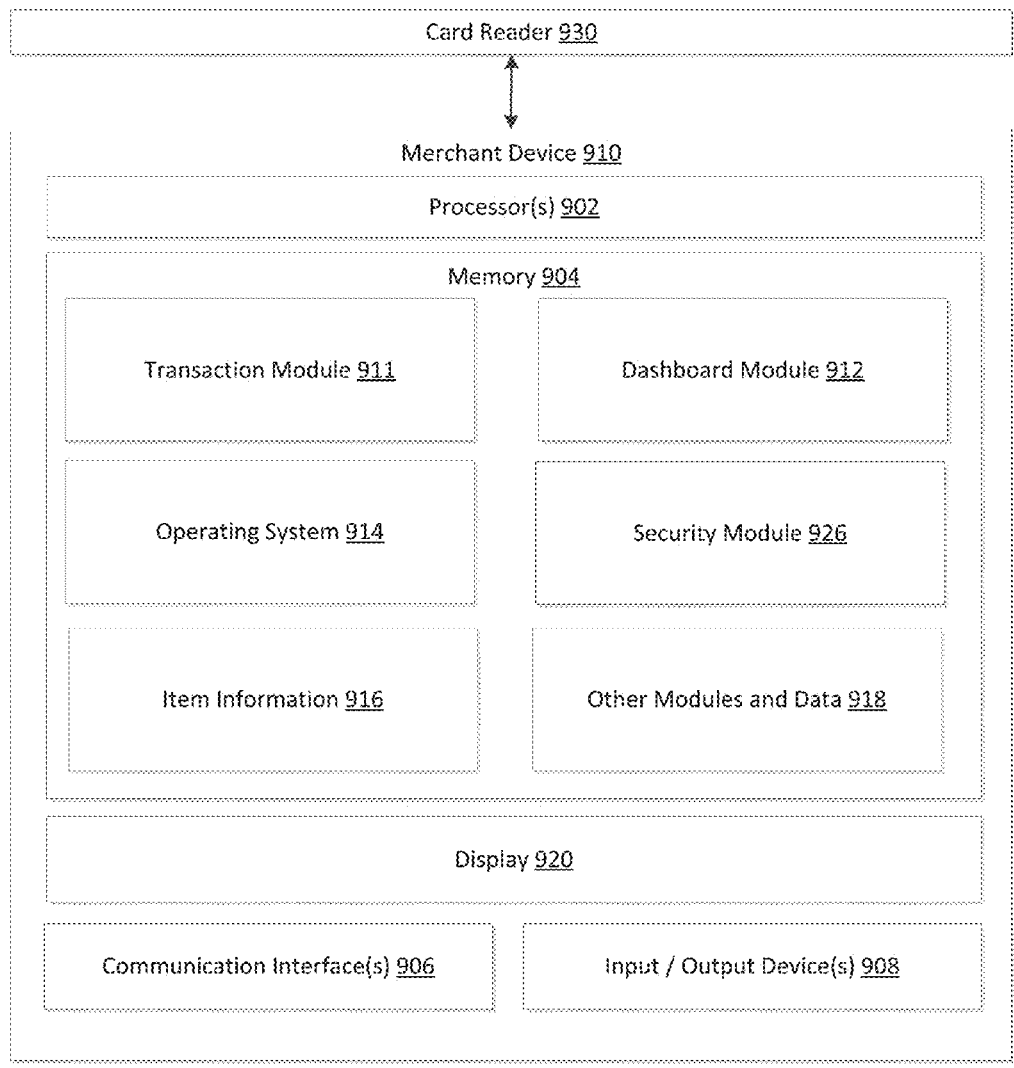
FIG. 9 illustrates an example block diagram of components of a merchant device.

In the example illustrated in FIG. 9, the merchant device 910 includes at least one processor 902, a memory 904, one or more communication interfaces 906, and one or more input/output (I/O) devices 908. Each processor 902 can itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some embodiments, the processor 902 can be one or more hardware processors and/or logic circuits of any suitable type specifically programmed or configured to execute the algorithms and processes described herein by performing various input/output, logical, and/or mathematical operations. The processor 902 can be configured to fetch and execute computer-readable processor-executable instructions stored in the memory 904.

Other components included in the merchant device 910 can include various types of sensors (not shown), which can include a GPS device, an accelerometer, gyroscope, compass, proximity sensor, and the like. Additionally, the merchant device 910 can include various other components that are not shown, examples of which include removable storage, a power source, such as a battery and power control unit, and so forth.

Depending on the configuration of the merchant device 910, the memory 904 can be an example of non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The computer-readable media can include, but is not limited to, RAM, ROM, EEPROM, flash memory, solid-state storage, magnetic disk storage, optical storage, and/or other computer-readable media technology. Further, in some cases, the merchant device 910 can access external storage, such as RAID storage systems, storage arrays, network attached storage, storage area networks, cloud storage, or any other medium that can be used to store information and that can be accessed by the processor 902 directly or through another computing device or network. Accordingly, the memory 904 can be computer storage media able to store instructions, modules or components that can be executed by the processor 902.

The memory 904 can be used to store and maintain any number of functional components or modules that are executable by the processor 902. In some embodiments, these functional components comprise instructions or programs that are executable by the processor 902 and that, when executed, implement operational logic for performing the actions and services attributed above to the merchant device 910. Functional components of the merchant device 910 stored in the memory 904 can include a transaction module 911, a dashboard module 912, and a security module 926, although it can also contain modules or portions of modules assigned herein to the payment processing system 102. The transaction module 911, dashboard module 912 and security module 926 can all be a part of a merchant application, for example merchant application 118, running on merchant device 116. The transaction module 911, for example, presents an interface, such as a payment interface to enable the merchant to conduct transactions, receive payments, and so forth, as well as for communicating with the payment processing system 102 for processing payments and sending transaction information. The dashboard module 912 enables the merchant to manage the merchant's account, the merchant profile, merchant preferences, view saved or new pricing information, communicate with the payment processing system 102 regarding cash advances, offers of incentives, invitations, and the like. The security module 926 can, as described herein, enable the merchant application to encrypt and decrypt transaction information communicated between the merchant device 910 and other system components. Additional functional components can include an operating system 914 for controlling and managing various functions of the merchant device 910 and for enabling basic user interactions with the merchant device 910.

In addition, the memory 904 can also store data, data structures and the like, that are used by the functional components. For example, data stored by the memory 904 can include item information 916 that includes information about the items offered by the merchant, which can include a list of items currently available from the merchant, images of the items, descriptions of the items, prices of the items, and so forth. For instance, when the merchant 122 is setting up the merchant application 118 to accept payments for particular items offered by the merchant 122, the merchant can enter the item information 916 for the particular items. Depending on the type of the merchant device 910, the memory 904 can also optionally include other functional components and data, such as other modules and data 916, which can include programs, drivers, etc., and the data used or generated by the functional components. Further, the merchant device 910 can include many other logical, programmatic and physical components, of which those described are merely examples that are related to the discussion herein.

The communication interface(s) 906 can include one or more interfaces and hardware components for enabling communication with various other devices, such as over the network(s) 114 or directly. For example, communication interface(s) 906 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 906 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 906 also provides other conventional connections to the network 114 for distribution of files and/or media objects using standard network protocols such as TCP/IP, HTTP, HTTPS and SMTP as will be understood.

The merchant device 910 can further include a display 920, which can employ any suitable display technology. For example, the display 920 can be a liquid crystal display, a plasma display, a light emitting diode display, an OLED (organic light-emitting diode) display, an electronic paper display, or any other suitable type of display able to present digital content thereon. In some embodiments, the display 920 can have a touch sensor associated with the display 920 to provide a touchscreen display configured to receive touch inputs for enabling interaction with a graphical user interface presented on the display 920. Accordingly, embodiments described herein are not limited to any particular display technology. Alternatively, in some embodiments, the merchant device 910 might not include the display 920, and information can be presented by other means, such as aurally.

The merchant device 910 can further include one or more I/O devices 908. The I/O devices 908 can include speakers, a microphone, a camera, and various user controls (e.g., buttons, a joystick, a keyboard, a keypad, etc.), a haptic output device, and so forth.

In addition, the merchant device 910 can include or can be connectable to a payment object reader 930. In some embodiments, the payment object reader 930 can plug in to a port in the merchant device, such as a microphone/headphone port, a data port, or other suitable port, or can communicate via wireless connection to the merchant device. The payment object reader 930 can include a card interface 906 for reading a magnetic stripe or an integrated circuit of a payment card 130, 132, and further can include encryption technology for encrypting the information read from the payment card 130, 132. Alternatively, numerous other types of payment object readers 930 can be employed with the merchant devices 910 herein, depending on the type and configuration of the merchant device 910.

Figure 10:
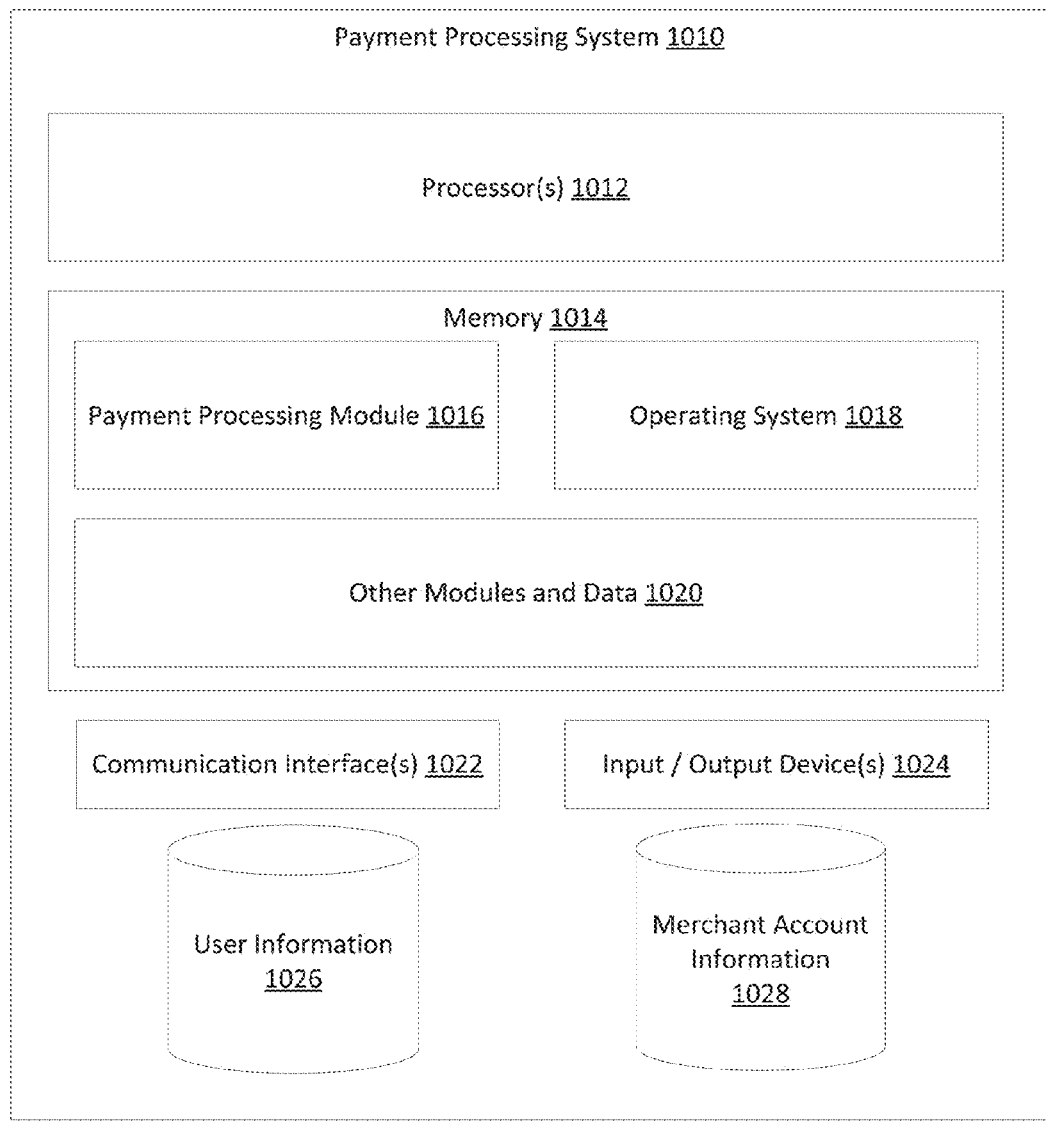
FIG. 10 illustrates an example block diagram of components of a payment processing system.

FIG. 10 is a block diagram illustrating select components of an example payment processing system 1010 according to some embodiments. The payment processing system 1010 can comprise the payment processing system 102 in an example embodiment. The payment processing system 1010 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 1010 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 1010. Multiple payment processing systems 1010 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 10, the payment processing system 1010 includes one or more processors 1012, one or more memory devices 1014, one or more communication interfaces 1022, and one or more input/output devices 1024. These components can be similar to those described above with reference to FIG. 1 and elsewhere herein.

The memory 1014 can be used to store and maintain any number of functional components or modules that are executable by the processor 1012. In some embodiments, these functional components comprise instructions or programs that are executable by the processor 1012 and that, when executed, implement operational logic for performing the actions and services attributed above to the payment processing system 1010. Functional components of the payment processing system 1010 stored in the memory 1014 can include the payment processing module 1016, the operating system 1018, and other modules and data 1020. These components can be similar to those described with reference to FIG. 1 and elsewhere herein. In addition, the memory 1014 can store data used for performing the operations described herein. Thus, the memory 1014 can store merchant information 1026, including the merchant profiles. Further, the payment processing system 1010 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A payment object reader that is configured to read data from payment objects using a near field communication (NFC) protocol, the payment object reader comprising:
    a NFC antenna configured to modulate a magnetic field to read data from a NFC-enabled payment object;
    a boost converter integrated circuit (IC) chip having a voltage output pin connected to the NFC antenna, and a feedback pin connected to a first feedback circuit, the boost converter IC chip configured to regulate a first voltage provided to the NFC antenna to modulate the magnetic field;
    the first feedback circuit connected at a first terminal to the NFC antenna, and connected at a second terminal to the feedback pin of the boost converter IC chip, whereby the boost converter IC chip monitors the first voltage at the NFC antenna;
    a second feedback circuit comprising a microcontroller having an analog-to-digital converter (ADC) input, and a digital-to-analog converter (DAC) output, the ADC input connected to the NFC antenna, and the DAC connected to the feedback pin of the boost converter IC chip by a line having a transistor and a resistor divider therein; and
    whereby the second feedback circuit is configured to feed an antenna voltage from the NFC antenna to the microcontroller through the ADC input, and the microcontroller can control the DAC output to the transistor based on the antenna voltage from the NFC antenna, in this manner the microcontroller is configured to control an amount of power provided to the NFC antenna by the boost converter IC chip such that the boost converter IC chip can be controlled to output an output voltage selected from a set of voltages including the first voltage and a second voltage as determined by the microcontroller, and the microcontroller is configured to account for factors affecting accuracy of the second voltage caused by signal drift from a desired output signal value due to temperature effects at the transistor.

2. The payment object reader of claim 1, further comprising a chip card reader interface and associated card contacts, and wherein the first voltage corresponds to a NFC transaction and the second voltage corresponds to a chip-type transaction.

3. The payment object reader of claim 1, wherein the boost converter IC chip is controlled to output the first voltage when the NFC-enabled payment object is positioned at least a first distance from the NFC antenna.

4. The payment object reader of claim 3, wherein the boost converter IC chip is controlled to output the second voltage when the NFC-enabled payment object is positioned at least a second distance from the NFC antenna, wherein the second distance is greater than the first distance.

5. The payment object reader of claim 1, wherein the second feedback circuit is configured to increase a value of the DAC output to increase a output from the first voltage to the second voltage.

6. The payment object reader of claim 1, wherein the first voltage and the second voltage are each pre-selected voltage values where the first voltage is greater than or less than the second voltage.

7. A payment object reader comprising:
    a microcontroller having an analog-to-digital converter (ADC) input and a digital-to-analog converter (DAC) output;
    a line having a transistor and a resistor divider therein, the line connected at a first end to the DAC output of the microcontroller, the line connected at a second end to a feedback pin of a boost converter integrated circuit (IC) chip to complete a feedback loop associated with the boost converter IC chip; and
    a non-transitory computer readable medium having instructions stored thereon that when executed are effective to cause the microcontroller to:
        receive, at the ADC input of the microcontroller, a first voltage provided by the boost converter integrated circuit (IC) chip to a payment object reader interface that is configured to read payment data from a payment object; and
        control the DAC output of the microcontroller that is coupled to the feedback pin of the boost converter IC chip via the line having the transistor and the resistor divider therein, the DAC output controlling an amount of power output by the boost converter IC chip to the payment object reader interface based on the ADC input, such that the amount of power output by the boost converter IC chip to the payment object reader interface is an output voltage selected from a set of voltages including the first voltage and a second voltage as determined by the microcontroller wherein the microcontroller is configured to account for factors affecting accuracy of the second voltage caused by signal drift from a desired output signal value due to temperature effects at the transistor.

8. The payment object reader of claim 7, wherein the payment object reader interface comprises a Near Field Communication (NFC) antenna.

9. The payment object reader of claim 7, wherein the payment object reader interface comprises a chip card interface.

10. The payment object reader of claim 7, wherein the instructions further cause the microcontroller to increase or decrease the DAC output based on the ADC input.

11. The payment object reader of claim 7, wherein the instructions further cause the microcontroller to check the ADC input in increments of a predetermined amount of time.

12. The payment object reader of claim 11, wherein the instructions further cause the microcontroller to adjust the DAC output according to the ADC input for each increment of the predetermined amount of time.

13. The payment object reader of claim 11, wherein the predetermined amount of time comprises 50 milliseconds (ms).

14. A method of controlling an output of a boost converter chip, the method comprising:
monitoring a first voltage at a near field communication (NFC) antenna connected to a first feedback circuit, the NFC antenna connected to the boost converter chip that is configured to regulate the first voltage provided to the NFC antenna, the NFC antenna configured to read data from a NFC-enabled payment object;
feeding the first voltage from the NFC antenna to a second feedback circuit, wherein the second feedback circuit is configured to feed the first voltage from the NFC antenna to a microcontroller of the second feedback circuit through an analog-to-digital converter (ADC) input of the microcontroller; and
controlling a digital-to-analog converter (DAC) output of the microcontroller that is coupled to a feedback pin of the boost converter chip, to thereby cause the boost converter chip to output an output voltage to the NFC antenna based on the ADC input, the output voltage selected from a set of voltages including the first voltage and a second voltage determined by the microcontroller.

15. The method of claim 14, further comprising:
determining a first predetermined amount of time has passed;
detecting a distance from the NFC antenna to a NFC-enabled payment object;
determining that the distance is less than a predetermined threshold distance; and
increasing a DAC output value of the DAC output.

16. The method of claim 15, wherein the microcontroller is configured to change the DAC output value linearly as the distance from the NFC antenna to the NFC-enabled payment device changes with respect to the predetermined threshold distance.

17. The method of claim 14, further comprising:
determining that a second predetermined amount of time has passed;
determining that a distance from the NFC antenna to a NFC-enabled payment object is greater than a predetermined threshold distance; and
decreasing a DAC output value of the DAC output.

18. The method of claim 14, wherein the microcontroller controls the DAC output by performing one of a set of software techniques on an ADC value of the ADC input, the set of software techniques including: an averaging technique, a histogram technique, a use of accurate voltage reference, a linear compensation technique, maintaining a lookup table, and a zone compensation technique.

19. The method of claim 14, further comprising maintaining a lookup table by storing a list of a plurality of ADC values of the ADC input and a list of corresponding DAC values to be output for each respective ADC value.

20. The method of claim 14, further comprising using a zone compensation technique by using a plurality of DAC values that each correspond to one of a plurality of zones of ADC values of a plurality of ADC values of the ADC input, such that the DAC is output that correspond to an ADC input one of the plurality of ADC values lying within one of the plurality of zones of ADC values.

21. The method of claim 14, wherein the DAC output of the microcontroller is coupled to a feedback pin of the boost converter IC chip via a line having a transistor and a resistor divider therein.

22. The method of claim 21, wherein the microcontroller is configured to account for factors affecting accuracy of the second voltage caused by signal drift from a desired output signal value due to temperature effects at the transistor.

* * * * *